United States Patent [19]

Elger et al.

[11] 4,120,694

[45] Oct. 17, 1978

[54] PROCESS FOR PURIFYING A TITANIUM-BEARING MATERIAL AND UPGRADING ILMENITE TO SYNTHETIC RUTILE WITH SULFUR TRIOXIDE

[75] Inventors: Gerald W. Elger; Ruth A. Stadler; Philip E. Sanker, all of Albany, Oreg.

[73] Assignee: The United States of America as represented by the Secretary of the Interior, Washington, D.C.

[21] Appl. No.: 830,523

[22] Filed: Sep. 6, 1977

[51] Int. Cl.$^2$ ............................ C22B 1/06; C22B 7/04
[52] U.S. Cl. ........................................... 75/1 T; 75/24; 75/97 R; 75/116; 423/69; 423/170; 423/554; 423/555
[58] Field of Search ............... 75/1 R, 1 T, 3, 4, 5, 75/24, 97 R, 97 A, 101 R, 104, 115, 116, 121, 84; 423/82, 83, 85, 86, 150, 69, 155, 166, 170, 554, 555; 106/300

[56] References Cited

U.S. PATENT DOCUMENTS

| | | | |
|---|---|---|---|
| 1,819,770 | 8/1931 | D'Ans | 423/21 |
| 1,820,455 | 8/1931 | Hooey | 75/116 |
| 1,964,747 | 7/1934 | Sweet et al. | 75/116 |
| 2,098,050 | 11/1937 | McBerty | 423/154 |
| 2,804,384 | 8/1957 | Armant | 75/1 T |
| 2,818,347 | 12/1957 | Brickenkamp | 75/121 |
| 2,919,982 | 1/1960 | Fetterolf | 75/1 T |

*Primary Examiner*—L. Dewayne Rutledge
*Assistant Examiner*—Michael L. Lewis
*Attorney, Agent, or Firm*—William S. Brown; Donald A. Gardiner

[57] ABSTRACT

A process for removing impurities from an oxide of titanium-bearing material such as a titania slag by treating the material with $SO_3$ gas and subsequently leaching with a liquid. In particular a process for upgrading an ilmenite ore by preparing a titania slag therefrom and purifying the slag such that it may be used as a synthetic rutile suitable for use in a fluidized-bed chlorination reactor to produce titanium tetrachloride which can be reoxidized to $TiO_2$.

13 Claims, No Drawings

PROCESS FOR PURIFYING A TITANIUM-BEARING MATERIAL AND UPGRADING ILMENITE TO SYNTHETIC RUTILE WITH SULFUR TRIOXIDE

BACKGROUND OF THE INVENTION

The invention relates to a process for removing impurities from an oxide of titanium-bearing material and, in a preferred embodiment, a process for upgrading ilmenite ore to synthetic rutile by the action of sulfur trioxide.

Titanium ores having commerical importance presently include rutile, which contains about 95% by weight titanium dioxide ($TiO_2$), and ilmenite ore which is nominally ferrous titanate containing about 45 to 65% by weight $TiO_2$. These two ores can be used in the production of $TiO_2$ suitable as pigments and fillers in paper and plastics with lesser amounts being used in metal production.

Production of $TiO_2$ pigment can be carried out by the sulfate process, in which ilmenite or titania-enriched smelter slag is reacted with concentrated sulfuric acid, or by the chloride process in which rutile or ilmenite is chlorinated to produce titanium tetrachloride which is reoxidized to $TiO_2$. The second process is preferred in that chloride plants employing rutile feed stock are less expensive and less waste problems are encountered as compared with production plants using the sulfate process. However, increased consumption of rutile in chloride-process pigment manufacture has placed increased demands upon the limited reserves of rutile, thereby increasing costs and rendering the process less economical.

Thus, there has been considerable interest in upgrading ilmenite to produce a synthetic rutile which can be substituted as the feed stock in existing fluidized bed chlorinators employing the chloride process for the production of titanium tetrachloride from rutile.

In U.S. Pat. No. 3,996,332, of which one of the present inventors was an inventor, a process is described whereby ilmenite is smelted to produce a slag which is then oxidized, with a titanium pyrophosphate flux in order to produce a synthetic rutile.

U.S. Pat. No. 3,560,153 describes a process whereby ilmenite is reacted with sulfur dioxide and a reductant in order to convert the ion present into the corresponding sulfide. The thus-treated ilmenite can then be leached, leaving behind the titanium dioxide.

In U.S. Pat. No. 3,860,412, a process is described where by a titaniferous material is upgraded into a feed stock suitable for the preparation of titanium tetrachloride by the direct chlorination method whereby the titaniferous material is communinuted, mixed with sulfuric acid and heated.

U.S. Pat. No. 3,252,787 covers a process for the production of a high quality titanium dioxide concentrate from a titaniferous ore, particularly ilmenite, by roasting the ore in air to convert the iron to the ferric state, reducing the ferric iron to metallic iron with a reducing agent and leaching out the metallic iron.

Further, titanium sulfide can be produced from "black sands" by heating with sulfur dioxide and a hydrocarbon gas as described in U.S. Pat. No. 3,313,601.

Generally, research on the upgrading of ilmenite involves the removal of iron by hydrometallurgical, pyrochemical or pyrometallurigical methods. These processes include the prereduction of ilmenite followed by 2-stage sulfuric acid leaching of the iron therefrom, the pre-reduction of ilmenite followed by reoxidation of metallic iron in a water slurry and separation of the hydrated iron oxides and, finally, a process based upon the selective chlorination of iron in ilmenite to separate iron chloride leaving rutile as the residue. However, such processes have not been particularly successful in utilizing the more abundant low grade ilmenite ores to produce a substitute chlorination feed stock which approaches natural rutile in $TiO_2$ content. Most of these processes are applicable to the use of high grade ilmenite ores from deposits of limited reserves.

Thus, various processes for the upgrading of ilmenite to synthetic rutile employ the initial conversion of the ilmenite into a titania slag, see especially U.S. Pat. Nos. 3,860,412 and 3,996,332. However, commercially produced titania slag contains associated alkaline earth impurities. These alkaline earth impurities form high boiling point chloride mixtures which can accumulate and cause defluidization of the bed in the subsequent chlorination reaction of the synthetic rutile to give titanium tetrachloride. In addition, these alkaline earth chloride mixtures form a liquid coating on the surface of the particles to be chlorinated, thus causing impeaded chlorination of the $TiO_2$ and an inefficient use of the chlorine.

It is therefore an object of the present invention to remove impurities, particularly alkaline earth impurities, from an oxide of titanium-bearing material.

It is a further object of the present invention to upgrade ilmenite in order to produce a synthetic rutile.

An additional object of the present invention is to upgrade ilmenite ore to produce a feed stock suitable for use in a chlorination reactor for the conversion of rutile to titanium tetrachloride.

An additional object of the present invention is to directly convert a titania slag to a feed stock suitable for use in a chlorination reactor for the conversion of rutile to titanium tetrachloride.

SUMMARY OF THE INVENTION

It has been found that impurities such as alkaline earth oxides present in titanium oxide materials can be selectively sulfated and subsequently leached out by the action of sulfur trioxide gas. In a particularly important aspect, titania slag from the smelting of ilmenite is reacted with sulfur trioxide gas whereby the calcium and magnesium oxide impurities are converted to double sulfates which can then be leached out of the slag with a liquid such as water. Further, the addition of oxygen to the sulfur trioxide gas results in a concurrent transformation of the titanium-bearing phases to rutile. That is, the action of oxygen can be utilized concurrently in order to convert the lower valence titanium oxides to titanium dioxide in the form of rutile.

Removal of the alkaline earth impurities by this process can result in a superior feed stock for the chlorination of synthetic rutile.

DETAILED DESCRIPTION OF THE INVENTION

The titanium-bering material which can be used in the reaction with sulfur trioxide is preferably a titaniferous slag. The titaniferous slag may be produced by smelting titanium ores such as ilmenite or titaniferous magnetite. Smelting conditions can be as described in U.S. Pat. Nos. 3,860,412 and 3,996,332. Generally, the smelting conditions are conventional although the slag produced should preferably have a low concentration of chlorine consumers other than titanium. Thus, the iron content of the slag, reported as FeO, should be kept below 10% by weight since high iron slags, e.g., 10 to 13% FeO, do not respond effectively to rutile synthesis. More preferably, the iron content should be in the range of about 3 to 5% by weight of FeO.

The titania slag may be produced from ilmenite concentrates by electric furnace smelting using coke or other forms of carbon as the reductant. Preferably, the ilmenite concentrate is blended with carbon in a small amount of calcium oxide flux which is then pelletized using appropriate binders. Carbon requirement are about 125 to 150% of the stoichiometric amount based upon the total reduction of iron oxides contained in the concentrate to give elemental iron with carbon going to the monoxide and on the saturation of the iron product with 3.5 to 4% by weight carbon. The calcium oxide or lime flux is added in an amount equivalent to about 2 to 5% by weight of the ilmenite charged. The purpose of the flux is to increase the slag fluidity so that the smelting step can be performed at lower temperatures and in order to facilitate the later processing of the slag. The slag liquidus temperatures will usually range from about 1300° to 1400° C when flux is used. It is possible to reduce residual iron oxides to levels substantially below 3% but such a severe reduction also results in the reduction of titanium dioxide to lower valent titanium oxide causing a significant increase in the slag liquidus temperature. A more detailed description of the electric furnace smelting of ilmenite concentrates may be found in the Bureau of Mines Report of Investigations 5170 (1955).

The reactor to be used can be any suitable device capable of achieving the proper temperatures and contact between the slag and the sulfur trioxide gas. Thus, a fixed bed vertical reactor can be used for batch reactions or a rotary kiln can be used in a continuous operation.

The sulfur trioxide can be commercially obtained or can be produced at the plant site by the reaction of sulfur dioxide with oxygen over a suitable catalyst such as $V_2O_5$ or platinum. If the sulfur trioxide is produced from sulfur dioxide, the catalyst is preferably $V_2O_5$ since this catalyst is less subject to poisoning. However, the conversion of sulfur dioxide can be accomplished by any conventionally known means.

Oxygen can be added to the sulfur trioxide feed stream in order to convert titanium oxides to the desired titanium dioxide state. Since oxygen is taken up by various reactants, principly carbon to produce $CO_2$, lower titanium oxides to produce $TiO_2$ and FeO to produce $Fe_2O_3$, the oxygen is preferably added in an amount of about 150 equivalent percent of these three oxygen consumers. That is, although most of the iron is removed in the smelting of the ilmenite, some iron is transferred to the slag and sufficient oxygen should be added to be certain that all titanium oxide forms are converted to titanium dioxide.

The temperature of the sulfur trioxide treatment can range from about 600° to about 1100° C. However, the particular temperature will depend somewhat upon the particular composition of the slag. Generally, temperatures higher than the about 600° to 1100° C range may result in the instability of the double sulfate of calcium and magnesium. Further, temperatures below this range may result in the formation of the sulfates of iron and titanium.

The reaction times can be suitably varied in order to maximize the formation of the alkaline earth sulfate impurities. Thus, by monitoring the sulfur content of the slag during the reaction, the reaction can be terminated upon the disappearance of increases in sulfur content of the slag.

Concentrations of sulfur trioxide can very widely in the reaction but suitable concentrations can be from about 50 to 100 cc/minute flowing over 25 grams of slag sample. If oxygen is added to the gas flow, a suitable amount can be about 100 cc/minute.

In a particularly preferred embodiment of the invention, the titania slag is heated in the reactor with sulfur trioxide and oxygen flowing thereover, the bed being heated at a temperature of about 600° to 1100° C as monitored by a thermocouple. In this embodiment, the cooling of the bed after the reaction is in an atmosphere of sulfur trioxide whereby the sulfur trioxide influences the equilibrium of the sulfates in their reconversion back to $SO_3$ so that the sulfates are not decomposed during this cooling stage. The sulfur trioxide can be present during cooling as a flow of gas or a static presence of the gas and sulfur dioxide can be substituted during this cooling stage.

Although the particle size of the slag to be reacted can vary widely, the slag is preferably ground so that the particles can pass through an 80 mesh sieve. It has been found that if the particles are ground too finely, the particles may have a tendency to sinter. Further, the ground slag can be agglomerated with a binder, such a sugar added in an amount of 2 to 3 pct. The agglomerated pellets can be ¼ to ½ inch in diameter. Such pellets are preferrably used in large scale operations in order to minimize dust formation.

Although the leaching of the reacted slag can be accomplished at various temperatures, room temperature is most convenient. Leaching with water at considerably higher temperatures is not advantageous since calcium sulfate is not as soluble in water at such higher temperatures. Preferably, the leaching liquid is water.

The off-gases from the reactor can suitably be neutralized with a scrubber solution such as an aqueous lime solution.

In general, the ilmenite ore materials used to produce the slag can comprise about 45 to 65% by weight titanium dioxide with higher concentrations being found in the slag. The titanium in the slag is generally present as a pseudobrookite-type structure illustrated by the following formulas:

$$(Mn^{2+}, Mg^{2+}, Fe^{2+}, Ti^{2+})O \cdot 2 TiO_2$$

and/or $$(Fe^{3+}, Al^{3+}, Ti^{3+},)_2O_3 \cdot TiO_2$$

After treatment with the sulfur trioxide and oxygen, X-ray diffraction data indicated that the treated slag contained rutile as a primary phase and a double sulfate $CaSO_4 \cdot 3M_gSO_4$ as a minor phase.

The following examples illustrates specific embodiments of the invention and are not to be taken as limiting.

EXAMPLE 1

A sample of a rock-type ilmenite from New York state was smelted under highly reducing conditions to produce a pig iron fraction and a reduced titania slag.

This titania slag was found to have the following composition by chemical analysis:

|  | % by weight |
| --- | --- |
| Ferrous Iron (as ferrous oxide) | 5.3 |
| TiO$_2$ | 70.6 |
| SiO$_2$ | 6.8 |
| MgO | 4.1 |
| CaO | 8.2 |
| Al$_2$O$_3$ | 4.5 |
| Other (including V and Cr) | 0.5 |
|  | 100.0 |

5-gram samples of the ground reduced slag containing pseudobrookite-type material as a primary phase and calcium titanite as a minor phase were treated with SO$_3$ and O$_2$, the SO$_3$ being formed by passing a mixture of SO$_2$ and O$_2$ over a V$_2$O$_5$ catalyst bed heated to 400° C. The reactor utilized was a 1 inch vertical tube furnace having a length of 18 inches.

Various temperatures of about 600° to 1100° C were used in the runs with sulfur analysis of the slag being taken periodically.

A slag sample treated at 900° C and cooled under a sulfur trioxide atmosphere was found to have a sulfur content after treatment of 5.6% by weight. After cooling to room temperature, the sample was allowed to sit in water at room temperature after which the sample was dried. About 60% by weight of the MgO and 40% by weight of the CaO were removed in the water leach of the treated slag samples as determined by chemical analysis.

EXAMPLE 2

The reduced titania slag utilized in Example 1 was divided into 100 grams samples and agglomerated with 2% by weight sugar on a disc pellitizer to form ¼ to ½ inch diameter pellets. The slag pellets were placed in a 2-inch vertical tube furnace having a length of 36 inches and were treated with SO$_3$ and oxygen mixtures for 8 to 16 hours. The sulfur trioxide flowed from a V$_2$O$_5$ catalyst reactor with nflows of sulfur dioxide at 300 cc/minute and oxygen at 300 cc/minute. Additionally, runs were made with sulfur dioxide and oxygen flow rates at 150 cc/minute each. By chemical analysis, it was determined that the maximum sulfur pick-up in the treated slag material occurred at about 900° C using the 150 cc/minute flow rates into the V$_2$O$_5$ catalyst reactor.

EXAMPLE 3

A sample of the untreated slag described in Example 1 was ground to pass through an 80 mesh sieve and agglomerated with 2% by weight sugar on a disc pelletizer to form ¼ to ½ inch diameter pellets.

About 1000 grams of the thus-produced pellets were introduced into a 2 inch diameter vertical shaft reactor as in Example 2. The reactor was heated to 900° C while a flow of argon was passed therethrough. Upon reaching the temperature of 900° C, a flow of sulfur trioxide and oxygen was passed through the reactor from the bottom. The two gases introduced were from a V$_2$O$_5$ catalyst reactor into which was passed 300 cc/minute of sulfur dioxide and 250 cc/minute of oxygen, the oxygen being in excess of that required to convert all of the sulfur dioxide. The V$_2$O$_5$ catalyst was obtained from the Baker Chemical Company.

After the reaction proceeded at 900° C for 16 hours, the reactor was sealed and allowed to cool to room temperature in the sulfur trioxide and oxygen atmosphere.

Chemical analysis of the thus-treated slag indicated that the slag had 4.65% by weight sulfur.

The slag was then ground to pass through a 65 mesh sieve and covered with water in a beaker with stirring at room temperature for 1 hour. After removing the water, the treated slag was dried and analysis indicated a 54% by weight reduction in MgO and a 45 % by weight reduction in CaO.

EXAMPLE 4

A sample of slag treated according to the present invention was chlorinated in order to produce titanium tetrachloride.

A slag sample was treated with sulfur trioxide and oxygen as in Example 3 and, after cooling to room temperature, was found to have 4.5% by weight sulfur. The pellets were then ground, leached with water and dried as in Example 3.

A sample of 833 grams of the dried slag treated according to the present invention was then reagglomerated with 17 grams of sugar and 319 grams of coke in preparation for a chlorination reaction. The pellets were about ¼ to 178 inch in diameter.

1107 grams of the pellets prepared from treated slag were then loaded into a 2 inch diameter vertical shaft reactor, 36 inches in length. The reactor was heated to 900° C and room temperature chlorine gas was passed through the reactor at a flow rate of about 2800 cc/minute. Thus, titanium tetrachloride gas is present in the off-gases of the reactor and the TiCl$_4$ is condensed from which TiO$_2$ is produced.

The off-gases of the reactor are monitored in order to determine the percentage of chlorine therein. During actual chlorination, the chlorine is present in an amount of about 5%. When the percentage of chlorine in the gases rises to about 60 to 70%, the chlorination is essentially finished. Thus, the reaction proceeded for about 175 minutes after which the reactor was allowed to cool.

Elemental analysis of the pellets in the chlorination reactor before and after chlorination indicated that 85.9% of the titanium originally in the pellets was extracted and removed in the form of titanium tetrachloride.

COMPARISON EXAMPLE 1

A chlorination reaction was conducted in a manner similar to that in Example 4 with the exception that the pellets utilized were not treated according to the present invention.

Slag pellets were prepared as in Example 4 above with the exception that the slag utilized was the untreated slag described in Example 1 having 70.6% TiO$_2$. The pellets were prepared with slag, sugar and coke in the proportions set forth in Example 4.

1000 grams of the pellets were introduced into the chlorination reactor described in Example 4 and after heating to 1050° C, chlorine gas was passed therethrough in the flow rate described in Example 4.

During the chlorination, it was observed that the outside of the pellets became white as caused by the formation of liquid salts of alkaline earth oxides. The reaction was terminated after 105 minutes in view of the significant rise of chlorine in the off gases of the reactor. When the cooled pellets were broken, it was observed that significant amounts of titanium dioxides were left unreacted.

Analysis of the pellets before and after chlorination indicated a removal of only 55% of the titanium present therein. While not wishing to be bound by theory, this is believed to be caused by the inability of the chlorine gas to penetrate the liquid salt coating caused by high percentages of alkaline earth oxides in the pellets.

What is claimed is:

1. A process for removing alkaline earth oxide impurities from a titania slag consisting essentially of reacting said slag with sulfur trioxide gas at a temperature of about 600° to 1100° C to form a reaction product containing alkaline earth sulfates, and subsequently leaching said sulfates from the reaction product with water.

2. The process of claim 1, wherein said slag comprises a titanium slag produced by the smelting of ilmenite ore.

3. The process of claim 2, wherein said ilmenite ore comprises about 45 to 65% by weight titanium dioxide.

4. The process of claim 1, wherein said impurities comprise calcium oxide and magnesium oxide.

5. The process of claim 1, wherein said reacting comprises the reaction of sulfur trioxide with at least one alkaline earth oxide to produce the corresponding sulfate.

6. The process of claim 1, wherein said reacting is in the presence of gaseous oxygen resulting in the conversion of lower valence titanium oxides to titanium dioxide.

7. A process for upgrading ilmenite ore to a synthethic rutile ore comprising the steps of:
 a. producing a titania slag containing alkaline earth impurities from ilmenite ore;
 b. reacting said titania slag with sulfur trioxide gas at 600° to 1100° C; and subsequently
 c. leaching said alkaline earth impurities from the titania slag with water.

8. The process of claim 7, wherein step a) comprises smelting ilmenite ore to produce a titania slag fraction.

9. The process of claim 8, wherein said ilmenite ore comprises about 45 to 65% by weight titanium dioxide.

10. The process of claim 7, wherein in step c), at least one alkaline earth sulfate is removed from the titania slag by said leaching.

11. The process of claim 10, wherein said at least one alkaline earth sulfate comprises the double sulfate $CaSO_4 \cdot 3MgSO_4$.

12. The process of claim 7, wherein in step (b), said reaction comprises the reaction of sulfur trioxide with at least one alkaline earth oxide to produce the corresponding sulfate.

13. The process of claim 7, wherein said reacting is in the presence of gaseous oxygen resulting in the conversion of lower valence titanium oxides to titanium dioxide.

* * * * *